(12) United States Patent
Fujita et al.

(10) Patent No.: US 9,944,801 B2
(45) Date of Patent: Apr. 17, 2018

(54) METAL MEMBER HAVING EXCELLENT CORROSION RESISTANCE, METHOD FOR PRODUCING THE SAME, AND MATERIAL AND METHOD FOR REPAIRING METAL MEMBER

(71) Applicant: Suzuki Motor Corporation, Hamamatsu-shi (JP)

(72) Inventors: Masahiro Fujita, Shizuoka-ken (JP); Shintaro Ono, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/763,346

(22) PCT Filed: Feb. 10, 2015

(86) PCT No.: PCT/JP2015/053596
§ 371 (c)(1),
(2) Date: Jul. 24, 2015

(87) PCT Pub. No.: WO2015/125660
PCT Pub. Date: Aug. 27, 2015

(65) Prior Publication Data
US 2016/0177104 A1   Jun. 23, 2016

(30) Foreign Application Priority Data

Feb. 18, 2014   (JP) .................................. 2014-028557

(51) Int. Cl.
  *C09D 5/08*   (2006.01)
  *C23C 22/66*  (2006.01)
  (Continued)

(52) U.S. Cl.
  CPC ............. *C09D 5/084* (2013.01); *C09D 5/086* (2013.01); *C23C 22/66* (2013.01); *C23C 22/83* (2013.01); *C25D 11/24* (2013.01); *C25D 11/08* (2013.01)

(58) Field of Classification Search
  CPC .......... C09D 5/084; C23C 22/66; C23C 22/83
  See application file for complete search history.

(56) References Cited

U.S. PATENT DOCUMENTS 6,069,197 A * 5/2000 Daech ...................... C09J 11/04
                                                156/327
6,451,443 B1  9/2002 Daech
  (Continued)

FOREIGN PATENT DOCUMENTS

CA    2356190 A1    6/2000
JP    S4818131 A    3/1973
  (Continued)

OTHER PUBLICATIONS

Translation of JP 2010-077532, Tanaka et al., Apr. 8, 2010, p. 1-7.*
  (Continued)

*Primary Examiner* — Hai Vo
(74) *Attorney, Agent, or Firm* — Lerner, David, Littenberg, Krumholz & Mentlik, LLP

(57) ABSTRACT

An object is to provide an environmentally benign metal member having excellent corrosion resistance which exhibits a long-lasting corrosion resistance effect even in a salt-water environment or the like in which a water current is present, without requiring an external factor such as ultraviolet light. Provided is a metal member having excellent corrosion resistance in which at least a surface is made of an aluminum-based metal, the metal member comprising a corrosion protection film containing a poorly water-soluble lithium compound on the surface or a solid material con-
  (Continued)

taining a poorly water-soluble lithium compound on the surface.

8 Claims, 1 Drawing Sheet

(51) Int. Cl.
  *C25D 11/24* (2006.01)
  *C23C 22/83* (2006.01)
  *C25D 11/08* (2006.01)

(56) References Cited

U.S. PATENT DOCUMENTS

| | | | |
|---|---|---|---|
| 2004/0001912 A1* | 1/2004 | Yapel | B05D 1/265 |
| | | | 427/8 |
| 2005/0037228 A1* | 2/2005 | Ishizuka | C09D 5/082 |
| | | | 428/626 |
| 2005/0121115 A1 | 6/2005 | Ruimi et al. | |
| 2010/0203237 A1 | 8/2010 | Conde Moragues et al. | |
| 2012/0025142 A1* | 2/2012 | Visser | C09D 5/084 |
| | | | 252/389.61 |
| 2012/0090737 A1* | 4/2012 | Fushiwaki | C21D 1/26 |
| | | | 148/533 |

FOREIGN PATENT DOCUMENTS

| | | |
|---|---|---|
| JP | S5742156 B2 | 9/1982 |
| JP | S6065719 A | 4/1985 |
| JP | H08179097 A | 7/1996 |
| JP | 2003327914 A | 11/2003 |
| JP | 2005008949 A | 1/2005 |
| JP | 2006307339 A | 11/2006 |
| JP | 2007297705 A | 11/2007 |
| JP | 2007320837 A | 12/2007 |
| JP | 2010077532 A * | 4/2010 |
| JP | 2011214106 A | 10/2011 |
| WO | 0036190 A2 | 6/2000 |
| WO | WO 2010112605 A1 * | 10/2010 ............. C09D 5/084 |

OTHER PUBLICATIONS

Supplementary European Search Report for Application No. EP15752894 dated Jul. 15, 2016.
International Search Report for Application No. PCT/JP2015/053596 dated Apr. 7, 2015.
Japanese Office Action for Application No. 2014-028557 dated Sep. 15, 2017.

* cited by examiner

METAL MEMBER HAVING EXCELLENT CORROSION RESISTANCE, METHOD FOR PRODUCING THE SAME, AND MATERIAL AND METHOD FOR REPAIRING METAL MEMBER

CROSS-REFERENCE TO RELATED APPLICATIONS

The present application is a national phase entry under 35 U.S.C. § 371 of International Application No. PCT/JP2015/053596 filed Feb. 10, 2015, which claims priority from Japanese Patent Application No. 2014-028557 filed Feb. 18, 2014, the disclosures of which are incorporated by reference herein.

TECHNICAL FIELD

The present invention relates to a metal member having excellent corrosion resistance, to a method for producing the metal member, and to a material and to a method for repairing a metal member.

BACKGROUND ART

An anodizing treatment has been performed as a method for improving the corrosion resistance of aluminum metal or an aluminum alloy (hereinafter, the aluminum metal or aluminum alloy is also referred to as an "aluminum-based metal"). The anodizing treatment is a method in which aluminum is oxidized to form an oxide film on the surface, and it has been used in a wide variety of applications ranging from household goods to parts for industrial use.

However, an anodic oxide film does not protect a defect portion, and hence there is a problem in that when a defect reaching the aluminum base material is created in the use of a product, corrosion in the defect portion proceeds and spreads to the surroundings. For example, the corrosion resistance of an aluminum exterior part of an outboard engine, which is used in a harsh corrosive environment, is improved by providing an anodic oxide film and a coating. However, the aluminum exterior part is easily damaged by contact with sand or rock, and corrosion proceeds at an accelerating pace when the defect portion comes into contact with seawater. The corrosion causes not only degraded appearance, but also operation failure due to the formation of a hole penetrating through the part. For this reason, there has been a need for a method for inhibiting the progress of corrosion even when a defect is created.

Besides the anodizing treatment, methods using zinc, which has sacrificial corrosion protection properties, have been known as methods for improving the corrosion resistance. The methods include a method in which the surface of an aluminum-based metal serving as a base material is coated with a coating material containing zinc powder such as a zinc-rich paint, and a method in which the surface is plated with zinc. In these methods, even when the base material is defective, zinc serves as a sacrificial anode and is dissolved in a self-sacrificial manner so as to exhibit a sacrificial corrosion protection function. In this manner, the corrosion protection in a defect portion is inhibited.

Moreover, methods for inhibiting corrosion in a defect portion have been known in which a coating material containing hexavalent chromium having a self-repairing function is applied onto the surface of a base material, or a film having a self-repairing function is formed on the surface of a base material to improve the corrosion resistance. A general coating material or film having a self-repairing function inhibits the corrosion in the defect portion in such a manner that the coating material component is dissolved in response to an external factor such as ultraviolet light and flows to the defect portion to cover the defect portion.

In addition to these methods using zinc or hexavalent chromium, methods using alkali metals such as lithium and sodium are known. For example, a method is known in which, to conduct a corrosion inhibition treatment on the surface of an aluminum-based metal, an aqueous solvent in which an alkali metal silicate, an oxidizing or reducing inorganic compound, and an inorganic phosphoric acid salt are dissolved or the like is applied onto the metal surface to form a corrosion inhibition film thereon (PTL 1). In this method, the corrosion is inhibited in such a manner that the insoluble silicate in the corrosion inhibition film blocks an aqueous solution containing a corrosive factor such as oxygen or chloride ions from reaching the metal. In addition, when a defect reaching the aluminum-based metal is created, the water-soluble silicate and the inorganic compound dissolved in the corrosion inhibition film migrate to the defect portion and causes formation of an aluminum passivation film to protect the damaged portion.

In addition, a method is also known in which a treated film is formed on a surface of an aluminum-based metal by bringing the aluminum-based metal into contact with an aqueous alkaline solution containing a lithium compound (PTL 2).

CITATION LIST

Patent Literature

[PTL 1] Japanese Unexamined Patent Application Publication No. 2007-297705
[PTL 2] Japanese Unexamined Patent Application Publication No. 2005-8949

SUMMARY OF INVENTION

Technical Problem

However, the methods using zinc have a problem in that a corrosive product is formed at the boundary between the base material and the coating in the defect portion because of the corrosion of zinc itself, causing peeling of the coating. Moreover, to obtain the sacrificial corrosion protection effect of zinc, an electrical continuity must be provided between the zinc and the base material. In an insulating film containing zinc, water moves in the film to provide the electrical continuity between the zinc and the base material, and zinc performs the function of the sacrificial corrosion protection. However, if the film has only fine voids through which water cannot pass, the zinc and the base material are not electrically continuous, and the zinc cannot provide the sacrificial corrosion protection function. In addition, since zinc presents a risk of resource depletion, a method without using zinc has been desired.

Furthermore, a general coating material or film having a self-repairing function requires an external factor such as ultraviolet light. However, some portions of an exterior part for an outboard engine or the like do not receive sufficient ultraviolet light because of the structure. In addition, when the part is immersed in water such as seawater in which a flow is always present, the self-repairing component cannot move to the defect portion appropriately, and accordingly, it produces a poor corrosion protection effect. In addition, since hexavalent chromium used as the self-repairing component is toxic, the use of hexavalent chromium is not desirable, from the viewpoints of consideration for the environment and the workability.

The method of PTL 1 is a method in which corrosion in a defect portion is inhibited in such a manner that the water-soluble silicate is dissolved in water and moves to the defect portion. For this reason, the method has a limitation in that it is difficult to exhibit the corrosion protection effect in use in an environment in which the dissolved water-soluble silicate does not readily flow to the defect portion. In addition, in the case of a part used in an environment in which the part is always in contact with water, such as an exterior part of an outboard engine, the water-soluble silicate is eluted over time, and a long-lasting corrosion protection effect cannot be obtained. Moreover, the method of PTL 2 is a method in which a chemical conversion coating is formed by bringing an aluminum alloy into contact with a treatment liquid. Hence, it is only possible to form an extremely thin film of approximately 1 μm, and a long-lasting corrosion resistance cannot be anticipated for aluminum alloys especially susceptible to corrosion, such as ADC12. In addition, when the part is integrated with surrounding parts, it is difficult to repair the aluminum alloy by treating only the defect portion with a single treatment liquid, when a defect is created in the aluminum alloy.

The present invention has been made in view of the above-described problems, and an object of the present invention is to provide an environmentally benign metal member having excellent corrosion resistance which exhibits a long-lasting corrosion resistance effect even in a saltwater environment or the like in which a water current is present, without requiring an external factor such as ultraviolet light.

Solution to Problem

To achieve the above-described object, an aspect of the present invention provides a metal member having excellent corrosion resistance in which at least a surface is made of an aluminum-based metal, the metal member comprising a corrosion protection film containing a poorly water-soluble lithium compound on the surface or a solid material containing a poorly water-soluble lithium compound on the surface.

In a mode of the metal member according to the present invention, the poorly water-soluble lithium compound is preferably at least one compound selected from the group consisting of $LiH(AlO_2)_2 \cdot 5H_2O$, $LiAl_2(OH)_7 \cdot H_2O$, $LiAlO_2$, $Li_3PO_4$, and $Li_2CO_3$.

In another mode of the metal member according to the present invention, the corrosion protection film is preferably a coating film in which the content of the poorly water-soluble lithium compound per unit area is 1 to 200 $g/m^2$.

In still another mode of the metal member according to the present invention, the metal member preferably further comprises a coating film above the corrosion protection film.

In still another mode of the metal member according to the present invention, the metal member preferably further comprises a porous film on the surface, and the solid material is filled in pores of the porous film.

In still another mode of the metal member according to the present invention, it is preferable that the solid material be in a form of particles or a plate, and be fixed onto the surface.

Another aspect of the present invention provides a method for producing a metal member in which at least a surface is made of an aluminum-based metal, the method comprising at least: a film formation step of forming a corrosion protection film containing a poorly water-soluble lithium compound on the surface; or a solid material disposition step of disposing a solid material containing a poorly water-soluble lithium compound on the surface.

In a mode of the method for producing a metal member according to the present invention, the poorly water-soluble lithium compound is preferably at least one compound selected from the group consisting of $LiH(AlO_2)_2 \cdot 5H_2O$, $LiAl_2(OH)_7 \cdot xH_2O$, $LiAlO_2$, $Li_3PO_4$, and $Li_2CO_3$.

In another mode of the method for producing a metal member according to the present invention, the method preferably further comprises, before the film formation step or the solid material disposition step, a step of preparing the poorly water-soluble lithium compound by immersing aluminum metal or an aluminum compound in an aqueous alkaline solution containing lithium ions, or by mixing an aqueous solution containing aluminate ions with the aqueous alkaline solution.

In still another mode of the method for producing a metal member according to the present invention, the film formation step preferably comprises a step of applying a coating material containing the poorly water-soluble lithium compound onto the surface to form a coating film in which the content of the poorly water-soluble lithium compound per unit area is 1 to 200 $g/m^2$.

In still another mode of the method for producing a metal member according to the present invention, it is preferable that the surface of the metal member comprise a porous film, and that the solid material disposition step be a step of filling pores of the porous film with the solid material.

Still another aspect of the present invention provides a material for repairing a metal member, the material comprising a poorly water-soluble lithium compound and a binder.

Still another aspect of the present invention provides a method for repairing a metal member including a surface made of an aluminum-based metal, the method comprising a step of applying a repairing material containing at least a poorly water-soluble lithium compound and a binder onto a defect portion in the surface.

Advantageous Effects of Invention

The present invention makes it possible to provide an environmentally benign metal member having excellent corrosion resistance which exhibits a long-lasting corrosion resistance effect even in a saltwater environment or the like in which a water current is present, without requiring an external factor such as ultraviolet light.

DESCRIPTION OF EMBODIMENTS

Figure 1:
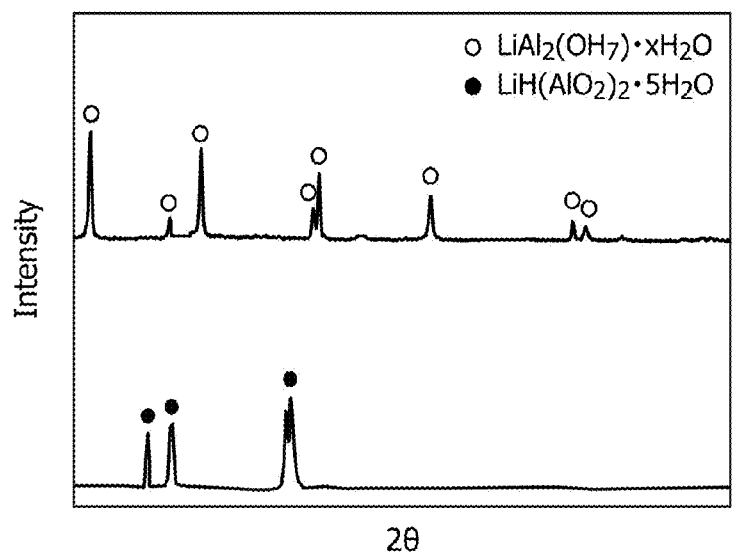
FIG. 1 is a graph showing XRD measurement results of poorly water-soluble lithium compounds each formed by using aluminum metal or aluminum oxide.
Figure 2A:
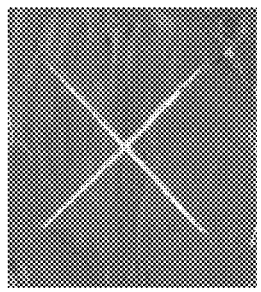
FIG. 2 shows photographs showing entire defect portions and cross-sections of the defect portions of test pieces subjected to a corrosion resistance test.
Figure 2B:
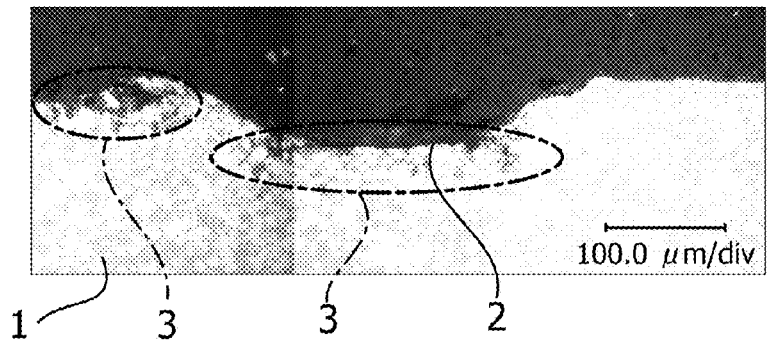
Figure 2C:
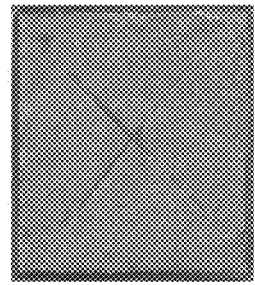
Figure 2D:
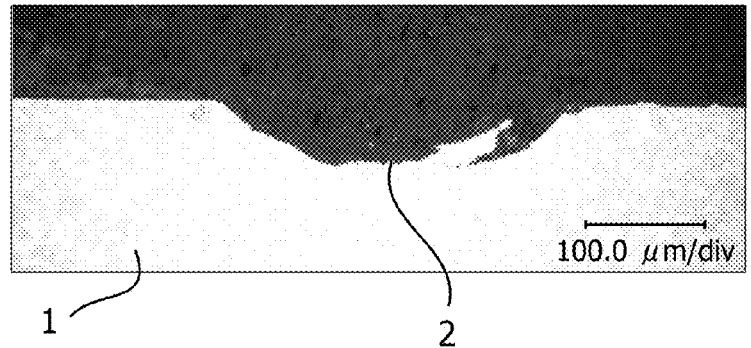

Hereinafter, a metal member, a method for producing the metal member, and a material and a method for repairing a metal member according to the present invention will be described in detail. The metal member according to the present invention is a metal member in which at least a surface is made of an aluminum-based metal, the metal member comprising a corrosion protection film containing a poorly water-soluble lithium compound on the surface or a solid material containing a poorly water-soluble lithium compound on the surface.

In the metal member according to the present invention, at least a surface is made of an aluminum-based metal. The surface made of the aluminum-based metal may be the entirety of the surface of the metal member or part of the surface of the metal member. The surface made of the aluminum-based metal preferably has a thickness of at least 10 μm. The metal member may be, for example, a cladded material in which an iron alloy and an aluminum alloy are laminated one on the other, an iron alloy plated with an aluminum alloy, or the like. The inside of the metal member may be made of any material, and examples of the material include iron, iron alloys, zinc alloys, titanium alloys, magnesium alloys, and the like. The entirety of the metal member may be made of an aluminum-based metal. The aluminum-based metals include aluminum alloys containing alloy components such as silicon and copper in addition to aluminum, and the like, as well as wrought aluminum materials, cast aluminum materials, and die-cast aluminum materials made of aluminum or aluminum alloys, and the like.

The corrosion protection film containing the poorly water-soluble lithium compound or the solid material containing the poorly water-soluble lithium compound is disposed on the surface of the metal member. The poorly water-soluble lithium compound has a sacrificial corrosion protection function. Specifically, the poorly water-soluble lithium compound has a function of dissolving in a self-sacrificial manner instead of the surface of the metal member, which is a base material. Hence, when a defect reaches the surface of the metal member, which is the base material, is created, the poorly water-soluble lithium compound is preferentially dissolved over the aluminum-based metal in the surface, so that the corrosion in the defect portion can be inhibited.

The poorly water-soluble lithium compound preferably has a solubility in water of 10 g/L or less at room temperature. Because of the poor water-solubility, the lithium compound is not eluted even in an environment in which the metal member is always in contact with water as in the case of an exterior part of an outboard engine or the like, and can exhibit its corrosion protection effect over a long period. On the other hand, if the lithium compound has a high solubility, the lithium compound is dissolved during the immersion of the metal member in water, and the corrosion protection effect may be lost early. In addition, if the lithium compound has a high solubility, the lithium compound is dissolved in water, which causes problems of peeling of the corrosion protection film and irregularities on the surface.

The poorly water-soluble lithium compound is preferably at least one compound selected from the group consisting of $LiH(AlO_2)_2 \cdot 5H_2O$, $LiAl_2(OH)_7 \cdot xH_2O$, $LiAlO_2$, $Li_3PO_4$, and $Li_2CO_3$. The poorly water-soluble lithium compound is more preferably a compound made of lithium and aluminum, such as $LiH(AlO_2)_2 \cdot 5H_2O$, $LiAl_2(OH)_7 \cdot xH_2O$, or $LiAlO_2$. When a compound made of lithium and aluminum comes into contact with water, the pH of the water remains neutral, and hence adverse effects are less likely to occur on the coating material and the surrounding parts.

Corrosion Protection Film

The corrosion protection film is preferably a coating film formed by applying a coating material containing the poorly water-soluble lithium compound onto the surface of the metal member. The coating film mainly contains the poorly water-soluble lithium compound and solid components of the coating material.

The poorly water-soluble lithium compound is preferably dispersed uniformly in the coating film. The average particle diameter of the poorly water-soluble lithium compound in the coating film is, for example, 0.1 to 100 μm, but it is not particularly limited thereto. The particle diameter is a value measured by using a laser diffraction scattering method (hereinafter, the same shall apply). The content of the poorly water-soluble lithium compound per unit area of the coating film, i.e., the amount of the poorly water-soluble lithium compound per square meter of the surface of the metal member is preferably 1 to 200 g. By setting the content of the poorly water-soluble lithium compound per unit area of the coating film to 1 $g/m^2$ or more, a corrosion resistance effect can be exhibited. Meanwhile, by setting the content per unit area in the coating film to 200 $g/m^2$ or less, the peeling of the coating film can be inhibited. If the content of the poorly water-soluble lithium compound exceeds 200 $g/m^2$, the amount of the poorly water-soluble lithium compound is so large that the coating film becomes brittle, and the appearance is marred by of irregularities.

The coating material is not particularly limited, as long as a film of the coating material can be formed on the surface of the aluminum-based metal. Examples of the coating material include acrylic resin-based coating materials, polyurethane resin-based coating materials, acrylic silicon-based coating materials, fluororesin-based coating materials, alcohol-based coating materials, and the like. The coating material may be a coating material such as a Magic Marker or the like. The coating material may be either electrically conductive or insulating.

The coating film may contain other components such as a pigment, an organic solvent, and an anti-corrosive agent. One skilled in the art can adjust, as appropriate, the contents of these components, unless adverse effects are exerted on the corrosion protection effect, color, and coating adhesion of the coating film.

The film thickness of the coating film is preferably 1 to 300 μm. If the film thickness is less than 1 μm, the amount of the poorly water-soluble lithium compound is so small that a long-lasting corrosion resistance improvement effect cannot be obtained in some cases. If the film thickness exceeds 300 μm, problems such as cracks in the film of the coating material or the like tend to occur.

The coating film is preferably a porous film having many fine pores. When the coating film is porous, the lithium ions generated by being dissolved in place of the aluminum-based metal can move through the fine pores, and an ion current flows. For this reason, even when the coating film is insulating, an electrical continuity can be provided between the surface of the aluminum metal, which is the base material, and the poorly water-soluble lithium compound in the coating film, and the poorly water-soluble lithium compound can exhibit the sacrificial corrosion protection function. The pore diameters of the fine pores preferably are of a size that allows lithium ions of approximately 0.06 nm in diameter to pass through the fine pores, and the pore diameters are, for example, 0.1 to 100 nm. In a conventional technology using zinc as a sacrificial corrosion protection component, the zinc and the base material must be electrically continuous with each other through the movement of water in the film in order for the zinc to exhibit the sacrificial corrosion protection function in the insulating film. Accordingly, the film has to have relatively large pores thorough which water (diameter: approximately 0.3 nm) can pass. In a film having only fine pores thorough which water cannot pass, the sacrificial corrosion protection effect of zinc cannot be obtained. On the other hand, in the present invention, the sacrificial corrosion protection function can be obtained, even when the insulating film has only fine pores through which water cannot pass, as long as the fine pores have sizes sufficient to allow lithium ions to move therethrough.

An anodic oxide film may be formed between the surface of the aluminum-based metal and the corrosion protection film. The anodic oxide film is formed by introducing a metal member having a surface of an aluminum-based metal in an anodizing treatment liquid, and applying a weak electric current with this metal member used as an anode to electrolyze the treatment liquid. The film thickness of the anodic oxide film is preferably, but not particularly limited to, 3 to 40 µm, in general. The anodic oxide film is an insulating porous film, and has spaces through which ions such as lithium ions can pass. The anodic oxide film is a hard film, and hence can make the surface of the metal member more resistant to defects and enhance the corrosion resistance.

The metal member according to the present invention may further comprise a coating film above the corrosion protection film. The coating film is a film formed by applying a coating material onto the corrosion protection film by an electrolytic treatment, spraying, immersion, or the like. Examples of the coating film include those of phthalate resins, amino-alkyd resins, epoxy resins, chlorinated rubbers, unsaturated polyester resins, acrylic resins, and non-aqueous dispersions, and the like. The corrosion resistance effect of the metal member can be further enhanced by providing the coating film above the corrosion protection film.

Solid Material of Poorly Water-Soluble Lithium Compound

Besides the mode provided with the corrosion protection film as described above, the metal member according to the present invention can be carried out in modes in which the solid material containing the poorly water-soluble lithium compound is disposed in any form on the surface. That is, specific examples of the form include a form (1) in which the solid material of the poorly water-soluble lithium compound is filled in pores of the porous film formed in the surface of the metal member, a form (2) in which the solid material of the poorly water-soluble lithium compound in a form of particles is attached onto the surface of the metal member with adhesive means such as a tape or a film, a form (3) in which the solid material of the poorly water-soluble compound in a form of a plate or foil is fixed onto the surface of the metal member by any means such as an adhesive agent, and the like. As described above, the solid material containing the poorly water-soluble lithium compound may be in any form such as foil, a powder, particles, or a plate.

The amount of the poorly water-soluble lithium compound disposed per unit area, i.e., the amount of the poorly water-soluble lithium compound disposed per square meter of the surface of the metal member is preferably 1 to 500 g. In the form (1) in which the amount of the poorly water-soluble lithium compound disposed is presumably the smallest among the above-described methods, the poorly water-soluble lithium compound can be dispersed uniformly over the metal member if the amount is 1 g or more. On the other hand, in the form (3) in which the amount of the poorly water-soluble lithium compound disposed tends to be the greatest, a longer-lasting corrosion protection effect can be obtained when a larger amount of the poorly water-soluble lithium compound is disposed. However, the amount of the poorly water-soluble lithium compound is preferably 500 g or less, because an amount more than 500 g causes an increase in weight.

In the form (1), the metal member includes the porous film in its surface. In the porous film, pores having an average pore diameter of, for example, 0.1 nm to 10 µm are uniformly dispersed and distributed, and the porosity thereof is preferably 10 to 70%. The porous film may be, for example, an anodic oxide film, an organic polymer film, a fluorine-containing film, a ceramic film, a zirconia film, a plating film, or the like. For example, the anodic oxide film includes two layers of a barrier layer and a porous layer. In addition, many fine pores, which play a role in decreasing the corrosion resistance, are present in the porous layer. In this form, the pores of the porous film are filled with the poorly water-soluble lithium compound. When the porous film is an anodic oxide film, the metal member becomes resistant to defects, because the anodic oxide film is hard. Even when a defect is created, the defect portion can be protected because the poorly water-soluble lithium compound exhibits the corrosion inhibition effect. Accordingly, the combination of the anodic oxide film with the poorly water-soluble lithium compound can further enhance the corrosion resistance of the metal member.

In the form (2), many particles of the poorly water-soluble lithium compound are attached onto the surface of the metal member with the adhesive means. The particles of the poorly water-soluble lithium compound preferably form a particle layer. The thickness of the particle layer is, for example, 0.01 to 1 mm, but is not particularly limited thereto. Examples of the adhesive means include a tape, a film, an electrically conductive adhesive agent, and the like. The average particle diameter of the particles of the poorly water-soluble lithium compound is preferably 0.1 to 100 µm.

In the form (3), the solid material of the poorly water-soluble lithium compound in a form of a plate or foil is fixed onto the surface of the metal member. The fixation to the surface of the metal member can be conducted by any means, as long as an electrical continuity is provided between the surface of the metal member and the poorly water-soluble lithium compound. For example, the fixation can be achieved by using an electrically conductive adhesive agent, a fastening part such as a bolt, or the like. The size of the solid material of the poorly water-soluble lithium compound in the form of a plate or foil can be determined, as appropriate, according to the area of the surface of the aluminum-based metal which requires the improvement in corrosion resistance. The thickness of the solid material is preferably at least 1 µm or more, and for example, 5 µm to 10 mm, from the viewpoint of causing the poorly water-soluble lithium compound to exhibit the corrosion protection effect.

The solid material containing the poorly water-soluble lithium compound may be disposed in direct contact with the surface of the metal member, or may be disposed with a layer capable of providing the electrical continuity between the solid material and the surface, such as an electrically conductive pressure-sensitive adhesive agent or a porous film having voids through which lithium ions can move, interposed therebetween.

In the metal member according to the present invention, the poorly water-soluble lithium compound functions as a sacrificial corrosion protection component. Hence, even when a defect reaching the aluminum metal-based surface is created, the corrosion in the defect portion can be inhibited. Moreover, in the metal member according to the present invention, a large amount of the poorly water-soluble lithium compound can be disposed on the surface of the metal member in contrast to surface treatments such as chemical conversion coating. Hence, a long-lasting corrosion inhibition effect can be expected. In addition, the metal member according to the present invention does not require any external factor such as ultraviolet light to obtain the corrosion inhibition effect, and the defect portion can be protected appropriately even in a saltwater environment or the like in which a flow of water is present.

In the metal member according to the present invention, even when a defect reaching the surface of the aluminum-based metal of the metal member is created, the poorly water-soluble lithium compound is dissolved in a self-sacrificial manner, and lithium forms lithium ions, but no corrosive product is formed. Moreover, the remainder other than lithium is bound to oxygen ions or the like to change into stable compounds, and almost no volume change occurs. For this reason, in the case of the metal member according to the present invention, the peeling of the film due to the formation of a corrosive product will not occur, and the appearance in terms of the design is not impaired, in contrast to the case in which zinc is used as the sacrificial corrosion protection component. Moreover, the metal member according to the present invention is also advantageous in that it is unnecessary to use zinc, which presents a risk of resource depletion.

In the metal member according to the present invention, the poorly water-soluble lithium compound is used as the sacrificial corrosion protection component. Hence, even in a saltwater environment or the like in which the metal member is always in contact with water, the poorly water-soluble lithium compound is not at risk of being eluted over time and the corrosion resistance effect will not be lost. Since the poorly water-soluble lithium compound is not eluted into water, the poorly water-soluble lithium compound does not change the pH of water therearound, and will not exert an adverse effect on other parts present around the metal member.

The metal member according to the present invention can be applied to products and parts used in a corrosive environment. The metal member according to the present invention can be preferably used for parts for an outboard engine which have to have corrosion resistance, such as an oil pan, a gear case, and a propeller for an outboard engine. An outboard engine is a propulsion system attached to a marine vessel. Since an outboard engine is in contact with seawater and salt air, parts constituting an outboard engine are required to have high corrosion resistance. An oil pan is a device that stores engine oil and also cools the engine oil with a stream of air during a cruise. The oil pan comes into direct contact with seawater and salt air, and hence is required to have high corrosion resistance.

Next, a method for producing a metal member according to the present invention is described. The method for producing a metal member according to the present invention comprising at least a film formation step of forming a corrosion protection film containing a poorly water-soluble lithium compound on a surface of a metal member in which at least a surface is made of an aluminum-based metal, or a solid material disposition step of disposing a solid material containing a poorly water-soluble lithium compound on the surface. The method for producing a metal member may further comprise, before the film formation step or the solid material disposition step, a step of preparing the poorly water-soluble lithium compound.

The poorly water-soluble lithium compound is preferably at least one compound selected from the group consisting of $LiH(AlO_2)_2 \cdot 5H_2O$, $LiAl_2(OH)_7 \cdot xH_2O$, $LiAlO_2$, $Li_3PO_4$, and $Li_2CO_3$. Some of the compounds made of lithium and aluminum such as $LiH(AlO_2)_2 \cdot 5H_2O$ and $LiAl_2(OH)_7 \cdot xH_2O$ may not be commercially available, and have to be prepared in advance.

In the step of preparing the poorly water-soluble lithium compound made of lithium and aluminum, the poorly water-soluble lithium compound is prepared, before the film formation step or the solid material disposition step, by immersing aluminum metal or an aluminum compound in an aqueous alkaline solution containing lithium ions or by mixing an aqueous solution containing aluminate ions with the aqueous alkaline solution.

The aluminum compound is, for example, aluminum oxide, aluminum hydroxide, or hydrated alumina. When aluminum metal or aluminum hydroxide is used, compounds represented by $LiAl_2(OH)_7 \cdot xH_2O$ such as $LiAl_2(OH)_7 \cdot 2H_2O$ tend to be formed. Meanwhile, when aluminum oxide or hydrated alumina is used, $LiH(AlO_2)_2 \cdot 5H_2O$ tends to be formed.

The aluminum metal or the aluminum compound may be used in any form such as a powder or a gel. The average particle diameter of the aluminum powder can be determined, as appropriate, by one skilled in the art, and is preferably 10 nm to 100 µm. When aluminum or an aluminum compound in the form of a powder is used, the aluminum metal or the aluminum compound on the surface of the powder is converted to the poorly water-soluble lithium compound by a reaction with an aqueous alkaline solution including a lithium ion solution. However, the inside of the powder does not change. For this reason, the smaller the particle diameter of the powder is, the higher the purity the obtained poorly water-soluble lithium compound. When aluminum or an aluminum compound in the form of gel is used for the reaction, a powder having many fine pores having diameters of approximately 10 to 100 nm is easily formed. Hence, the specific surface area increases, and the sacrificial corrosion protection effect can be obtained easily.

The aluminum metal or the aluminum compound may be in the form of an aluminum part or an aluminum part having an anodic oxide film (aluminum oxide). When an aluminum part is immersed in the aqueous alkaline solution containing lithium ions, the aluminum component is eluted into and reacts with the alkaline solution containing lithium ions. Thus, the poorly water-soluble lithium compound can be deposited in the aqueous solution. By this reaction, a compound having a higher purity can be obtained than that in the case in which an aluminum powder is used. When an aluminum part having an anodic oxide film is used, it is also possible to use the obtained aqueous solution containing the poorly water-soluble lithium compound directly for filling the pores of the anodic oxide film with the poorly water-soluble lithium compound.

The poorly water-soluble lithium compound can be prepared also by mixing, instead of the aluminum metal or the aluminum compound, an aqueous solution containing aluminate ions with the aqueous alkaline solution containing lithium ions. The aqueous solution containing aluminate ions can be prepared by dissolving, for example, sodium aluminate, potassium aluminate, calcium aluminate, or the like into water. The pH of the aqueous solution containing aluminate ions is preferably 8 to 14. Since the aqueous solution containing lithium ions is alkaline, the change in pH due to a neutralization reaction can be reduced by making the aqueous solution containing aluminate ions alkaline. The concentration of the aqueous aluminate ion solution is preferably equal to the upper limit of the solubility of a reagent used or preferably takes a value close to the solubility, because the reactivity is poor at a low concentration. When the aqueous solution containing aluminate ions and the aqueous alkaline solution containing lithium ions are mixed with each other, the poorly water-soluble lithium compound is deposited in the aqueous solution. The obtained poorly water-soluble lithium compound has a feature of a higher purity than that obtained in the case of preparation using an aluminum powder.

A lithium ion source of the aqueous alkaline solution containing lithium ions is, for example, lithium sulfate, lithium chloride, lithium nitrate, lithium carbonate, lithium phosphate, lithium hydroxide, or a hydrate of any of them. Lithium hydroxide and lithium carbonate are more preferable, because aqueous solutions thereof are basic. The pH of the aqueous alkaline solution containing lithium ions is preferably 10.5 to 14, more preferably 11 or higher, and most preferably 12 or higher. Making the aqueous solution alkaline with a pH of 10.5 to 14 brings about such an effect that the aluminate is more likely to be present in the form of ions, and hence the reactivity increases. When the pH is 12 or higher, the poorly water-soluble lithium compound can be deposited more rapidly. The pH can be adjusted by adding an acid such as sulfuric acid, oxalic acid, phosphoric acid, or chromic acid, or a base such as sodium hydroxide, sodium phosphate, or sodium fluoride.

Conditions such as the concentration of the aqueous alkaline solution containing lithium ions, the temperature, and the reaction time can be adjusted, as appropriate, by those skilled in the art according to the form, amount, and size of the aluminum and the like. For example, when an aluminum powder is used, the following conditions are preferable. The concentration of lithium ions in the aqueous alkaline solution containing lithium ions is preferably a concentration equal to or close to the upper limit of the solubility. For example, when an aqueous lithium hydroxide solution is used, the lithium ion concentration is preferably 30 g/L, which is the upper limit of solubility. This is intended to prevent the decrease in the reactivity due to the lowering of the lithium ion concentration with the progress of the reaction. A higher liquid temperature of the aqueous alkaline solution containing lithium ions and a longer treatment time are preferable, because the reaction can be carried out reliably. However, from the viewpoint of the balance between the production efficiency and the consumed energy, the liquid temperature is preferably 10 to 70° C., and the reaction time is preferably 0.1 to 30 minutes. The obtained poorly water-soluble lithium compound is preferably purified on the basis of the difference in specific gravity between the aluminum powder and the poorly water-soluble lithium compound, for example, by separation by a centrifugal force or on the basis of the difference in sedimentation rate in water, or other means.

The method as described above makes it possible to prepare the poorly water-soluble lithium compound by using a small number of readily available reagents through simple steps. This contributes to the improvement in corrosion resistance of the metal member at low costs. Moreover, this method is also advantageous in that the management of the reagents, the disposal of the waste liquid, and the like are easy, because no toxic substance or no special reagent is used.

In the film formation step, the corrosion protection film is formed by applying a coating material containing the poorly water-soluble lithium compound onto the surface of the metal member. The same coating material as described above can be used. As the poorly water-soluble lithium compound, a poorly water-soluble lithium compound which is commercially available or which is prepared by the above-described method can be used. The poorly water-soluble lithium compound is preferably in the form of powder, and is uniformly dispersed in the coating material. The average particle diameter of the powder is preferably 0.1 to 100 µm. Setting the average particle diameter of the powder to 0.1 to 100 µm yields the effect that the powder can be dispersed more easily in the entire film.

The application of the coating material can be conducted in a usual manner, and can be conducted by, for example, spray coating, dip-coating, electrodeposition, electrostatic coating, powder coating, brush coating, or the like. After the application, the coating material is dried by spontaneous evaporation, blowing air, or the like. Moreover, if necessary, the coating material is subjected to a curing treatment by means of heating, an electron beam, ultraviolet light, or the like. The application amount is preferably such an amount that the content of the poorly water-soluble lithium compound per unit area of the coating film can be 1 to 200 g/m$^2$ after drying. The application is preferably conducted so that the film thickness of the coating film can be 1 to 300 µm after drying.

After the film formation step, a step of further forming a coating film on the coating film may be conducted optionally. As this coating film, the same coating film as described above can be formed in a usual manner. The further formation of the coating film can enhance the corrosion resistance.

In the solid material disposition step, a solid material of the poorly water-soluble lithium compound is disposed on the surface made of an aluminum-based metal of the metal member. The amount of the poorly water-soluble lithium compound disposed per unit area, i.e., the amount of the poorly water-soluble lithium compound disposed per square meter of the surface of the metal member is preferably 1 to 500 g.

The solid material of the poorly water-soluble lithium compound can be disposed by, for example, a method (1) in which the solid material of the poorly water-soluble lithium compound is filled into pores of a porous film formed on the surface of the metal member, a method (2) in which the solid material of the poorly water-soluble lithium compound in the form of particles is attached to the surface of the metal member by using adhesive means such as a tape or a film, a method (3) in which the solid material of the poorly water-soluble compound in the form of a plate or foil is fixed onto the surface of the metal member by using any means such as an adhesive agent, or the like.

In the method (1), the pores of the porous film formed on the surface of the metal member are filled with the solid material of the poorly water-soluble lithium compound. In the formed porous film, pores having an average pore diameter of, for example, 0.1 nm to 10 µm are uniformly dispersed and distributed, and the porosity thereof is preferably 10 to 70%. The film thickness of the porous film is, for example, 1 to 100 µm. The porous film is, for example, an anodic oxide film, an organic polymer, a fluorine-containing film, a ceramic film, a zirconia film, a plating film, or the like, and can be formed on the surface of the metal member by a known method. For example, the anodic oxide film is formed by introducing a metal member having a surface of an aluminum-based metal into an anodizing treatment liquid, and applying a weak direct, alternating, or alternating-direct current with this metal member used as an anode to electrolyze the treatment liquid. As the anodizing treatment liquid, for example, an acidic aqueous solution of sulfuric acid, oxalic acid, phosphoric acid, chromic acid, or the like or a basic aqueous solution of sodium hydroxide, sodium phosphate, sodium fluoride, or the like can be used. The film thickness of the anodic oxide film is preferably 3 to 40 µm, but is not particularly limited thereto.

The pores of the porous film can be filled with the poorly water-soluble lithium compound by using, for example, an impregnation method or the like. As an impregnation liquid used in the impregnation method, the above-described aqueous solution in which the poorly water-soluble lithium compound is prepared and deposited can be used. The poorly water-soluble lithium compound immediately after the deposition is so small as to be invisible to the eye, and is suspend in the aqueous solution. The pH of this aqueous solution is made neutral by adding nitric acid or sulfuric acid to this aqueous solution, and the porous film is immersed in the aqueous solution. Then, stirring is continued, for example, at a temperature of 40 to 90° C. for 30 minutes to 2 hours. Thus, the poorly water-soluble lithium compound can be deposited in the pores of the film. Conditions such as the immersion time and the temperature can be adjusted, as appropriate, by one skilled in the art according to the amount of the aqueous solution used.

In the method (2), the solid material of the poorly water-soluble lithium compound in the form of particles is attached onto the surface of the metal member by using adhesive means. Preferably, a particle layer of the particles of the poorly water-soluble lithium compound is formed on the surface of the metal member. The thickness of the particle layer is, for example, 0.01 to 1 mm, but is not particularly limited thereto. Examples of the adhesive means include a tape, a film, an electrically conductive adhesive agent, and the like. As the particles of the poorly water-soluble lithium compound, those having an average particle diameter of 0.1 to 100 µm can be used preferably.

In the method (3), the solid material of the poorly water-soluble compound in the form of a plate or foil is fixed onto the surface of the metal member by using any fixation means such as an adhesive agent. The size and thickness of the solid material of the poorly water-soluble lithium compound in the form of a plate or foil can be set as described above. The fixation of the solid material to the metal member surface can be conducted by any means in a form with which the electrical continuity between the surface of the metal member and the poorly water-soluble lithium compound can be provided, and, for example, can be conducted by using a fixation means such as an electrically conductive adhesive agent or a fastening part including a bolt.

The solid material containing the poorly water-soluble lithium compound may be disposed in direct contact with the surface of the metal member, or may be disposed with a layer capable of providing the electrically continuity between the solid material and the surface of the metal member, such as an electrically conductive pressure-sensitive adhesive agent or a porous film having pores with pore diameters thorough which lithium ions can pass, interposed therebetween.

Next, a material for repairing a metal member according to the present invention is described.

The material for repairing a metal member comprises at least a poorly water-soluble lithium compound and a binder. The content of the poorly water-soluble lithium is preferably 30 to 80% by mass. The content of the binder is preferably 20 to 70% by mass. Examples of the binder include acrylic resins, urethane resins, fluororesins, epoxy resins, polyester resins, and the like. The material for repairing a metal member preferably further comprises a solvent. Examples of the solvent include water, ethanol, ethyl acetate, hexane, acetone, and the like. The material for repairing a metal member may comprise any of other components such as a pigment, a filler, a plasticizer, an antifouling agent, and a curing accelerator. The repairing material is preferably a coating material containing a poorly water-soluble lithium compound. The coating material containing the poorly water-soluble lithium compound is the same as that stated in the description of the film formation step in the method for producing a metal member. The material for repairing a metal member can be used for repairing a defect portion of a metal member having a surface made of an aluminum-based metal by the following method, and can inhibit the corrosion in the defect portion.

Next, a method for repairing a metal member according to the present invention is described.

The method for repairing a metal member is a method for repairing a metal member including a surface made of an aluminum-based metal, the method comprising a step of applying the above-described repairing material containing the poorly water-soluble lithium compound and the binder onto a defect portion in the surface. The repairing material can be applied in a usual manner, and can be applied by using, for example, a spatula or the like. After the application step, a step of drying the repairing material may be conducted optionally. The drying can be carried out by spontaneous evaporation, blowing air, or the like in a usual manner.

The application amount (the film thickness after drying) is preferably 1 µm or more. In general, the repairing material may be applied in such manner that the height of the defect portion can be equal to the height of the surroundings of the defect portion.

According to the repairing method according to the present invention, the defect portion is covered by applying the repairing material onto the defect portion, so that the corrosion in the defect portion can be inhibited. When a defect is created in a surface of a metal member, especially a part used in an environment in which the part is always in contact with water, such as an exterior part of an outboard engine, substances such as salt which promote the corrosion adhere to the defect portion. For this reason, even when the defect portion is covered with a generally used repairing material, the corrosion proceeds in the inside because of the attached salt and the like. As a result, a hole may be formed inside the part. On the other hand, the repairing method according to the present invention makes it possible to inhibit the progress of corrosion in the defect portion for a long period because of the sacrificial corrosion protection function of the poorly water-soluble lithium compound, even when a corrosion promotion substance such as salt remains on the defect portion. Moreover, the repairing method according to the present invention is advantageous in that, when a defect is created in a part, it is only necessary to repair the defect portion alone. On the other hand, in a repairing method based on the formation of a chemical conversion coating, it is necessary to detach the part from other parts or remove a coating film and then treat the entire part. Hence, the process is complicated, and the workload is large.

EXAMPLES

Hereinafter, the present invention will be described specifically on the basis of Examples. However, the metal member and the method for producing the metal member according to the present invention are not limited to the Examples below.

Preparation Examples of Poorly Water-Soluble Lithium Compounds

Preparation Example 1

A pure aluminum plate (commercially available product) was provided, and immersed in an aqueous alkaline solution (20° C.) containing 3 g/L of lithium ions with a pH of 13 for 1 hour. After the immersion, the pure aluminum plate remaining undissolved in the solution was taken out, and the aqueous solution was left overnight to deposit a poorly water-soluble lithium compound. The deposited poorly water-soluble lithium compound was collected, washed with ion-exchanged water, and then dried in an oven at 120° C. to obtain a powder. As shown in FIG. 1A, the result of an X-ray diffraction (XRD) analysis of the obtained powder showed that the powder was $LiAl_2(OH)_7 \cdot xH_2O$.

Preparation Example 2

An aluminum oxide powder (with an average particle diameter of 1 μm, commercially available product) was provided, and immersed for 20 minutes in an aqueous solution containing lithium ions under the same conditions as those for the above-described pure aluminum plate. After that, the powder was collected and added into water, and a poorly water-soluble lithium compound was separated and collected on the basis of the difference in specific gravity. The collected poorly water-soluble lithium compound was dried in an oven at 120° C. to obtain a powder. As shown in FIG. 1B, the result of an X-ray diffraction (XRD) analysis of the obtained powder showed that the powder was $LiH(AlO_2)_2 \cdot 5H_2O$.

Accordingly, it has been found that the compound represented by $LiAl_2(OH)_7 \cdot xH_2O$ tends to be formed when aluminum metal is used for the preparation of the poorly water-soluble lithium compound, whereas $LiH(AlO_2)_2 \cdot 5H_2O$ tends to be formed when aluminum oxide is used.

Experimental Example 1

Evaluation of Effects of Content of Lithium Compound

1. Preparation of Metal Member

An aluminum alloy ADC12 material was used as a test piece. In a pretreatment, the test piece was immersed as an anode in a 200 g/L sulfuric acid bath, and a direct current was applied for 10 minutes at a current density of 1.5 A/dm². Thus, an anodic oxide film (an insulating porous film having a pore diameter of 0.02 μm) having a thickness of 3 μm was prepared. The poorly water-soluble lithium compound ($LiAl_2(OH_7) \cdot xH_2O$) was mixed with a commercially available acrylic-based coating material capable of forming an insulating porous film, and the mixture was applied onto the test piece. The content of the poorly water-soluble lithium compound per unit area in the coating film was varied in the range from 0.1 to 220 g/m², as shown in Table 1. The coating material was applied by using a brush onto the test piece on which the anodic oxide film was formed, and allowed to dry naturally. In this manner, a metal member of each of Preparation Examples 1 to 9 was obtained.

2. Corrosion Resistance Test of Defect Portion

In each of the metal members of Preparation Examples 1 to 9, defects reaching the aluminum base material were created in a cross shape by using a metal rod having a sharp tip. After the formation of the defects, a salt spray test (JIS-Z-2371) was conducted for 120 hours to evaluate whether white corrosion formed at the defect portion. Table 1 shows the results. In Table 1, the evaluation of the corrosion resistance in the defect portion is expressed by "present" when no white corrosion was formed, or "formation of white corrosion" when white corrosion was formed. In addition, the evaluation of an influence on the film was expressed by "absent" when the addition of the poorly water-soluble lithium compound exerted no influence on the coating, or "present" when some adverse influence was observed such as embrittlement of the film.

TABLE 1

Results of Salt Spray Test

| | Content of poorly water-soluble lithium compound [g/m²] | Corrosion resistance of defect portion | Adverse effects on film | Overall result |
|---|---|---|---|---|
| Prep. Ex. 1 | 0.1 | Formation of white corrosion | Absent | Poor |
| Prep. Ex. 2 | 0.5 | Formation of white corrosion | Absent | Poor |
| Prep. Ex. 3 | 1 | Present | Absent | Good |
| Prep. Ex. 4 | 10 | Present | Absent | Good |
| Prep. Ex. 5 | 20 | Present | Absent | Good |
| Prep. Ex. 6 | 50 | Present | Absent | Good |
| Prep. Ex. 7 | 100 | Present | Absent | Good |
| Prep. Ex. 8 | 200 | Present | Absent | Good |
| Prep. Ex. 9 | 220 | Present | Present | Poor |

As shown in Table 1, no white corrosion formed at the defect portion in each of Preparation Example 3 to 8 in which the content of the poorly water-soluble lithium compound in the film was 1 g/m² or more. However, in Preparation Example 9, the amount of the poorly water-soluble lithium compound in the film was so large that the film surface was irregular, and moreover the film was partially peeled off in a collapsing manner when the defects were created. This has shown that the content of the poorly water-soluble lithium compound in the film is preferably 1 to 200 g/m².

Moreover, among the metal members subjected to the salt spray test, the surface of the defect portion of each of Preparation Example 1 in which white corrosion was formed in the defect portion, and Preparation Example 5 in which no white corrosion was formed that was visible to the naked eye. In addition, the defect portion was cut, and the cross-section of the defect portion was observed under an optical microscope. FIG. 2 shows the results.

Part (a) of FIG. 2 is a photograph of the entire defect portion of Preparation Example 1, and Part (b) of FIG. 2 is a photograph of the cross-section of the defect portion of Preparation Example 1 taken under the optical microscope. Part (c) of FIG. 2 is a photograph of the entire defect portion of Preparation Example 5, and Part (d) of FIG. 2 is a photograph of the cross-section of the defect portion of Preparation Example 5 taken under the optical microscope. As shown in Parts (a) and (c) of FIG. 2, the formation of the white corrosion was observed all over the defect portion of the Preparation Example 1, whereas no white corrosion was observed in the defect portion of Preparation Example 5. As shown in Part (b) of FIG. 2, corroded portions 3 were observed in and around the defect portion 2 formed in the aluminum base material 1 in Preparation Example 1 after the salt spray test. On the other hand, as shown in Part (d) of FIG. 2, it was found that no corrosion developed in and around the defect portion 2 in Preparation Example 5 after the salt spray test. Accordingly, the improvement effect of the corrosion resistance by the sacrificial corrosion protection function of the poorly water-soluble lithium compound was demonstrated.

Experimental Example 2

Evaluation of Type of Lithium Compound

1. Preparation of Metal Member

An aluminum alloy ADC12 material was used as a test piece. In a pretreatment, the test piece was immersed as an anode in a 200 g/L sulfuric acid bath, and a direct current was applied for 10 minutes at a current density of 1.5 A/dm$^2$. Thus, an anodic oxide film (an insulating porous film having a pore diameter of 0.02 μm) having a thickness of 3 μm was prepared. Effects of poorly water-soluble lithium compounds and highly water-soluble lithium compounds were tested by mixing each of the compounds with a coating material. The coating material used was the same commercially available acrylic-based coating material as that in Experimental Example 1. Each of the poorly water-soluble lithium compounds (LiH(AlO$_2$)$_2$.5H$_2$O, LiAlO$_2$, Li$_3$PO$_4$, and Li$_2$CO$_3$) or the highly water-soluble lithium compounds (LiOH.H$_2$O and Li$_2$SiO$_3$) was mixed with the coating material, and the mixture was applied onto the test piece on which the anodic oxide film was formed. The contents of the lithium compounds in the coating liquids were 10 to 100 g/m$^2$ as shown in Table 2. After the application, the coating material was allowed to dry naturally. Thus, metal members of Preparation Examples 10 to 13 and Reference Examples 1 and 2 were obtained.

2. Corrosion Resistance Test of Defect Portion

In each of the metal members of Preparation Examples 10 to 13 and Reference Examples 1 and 2, defects reaching the aluminum base material were created by using a metal rod having a sharp tip. After the defects were created, the salt spray test was conducted for 120 hours to evaluate whether white corrosion was formed in the defect portion. Table 2 shows the results. In Table 2, the evaluation results are expressed in the same manner as in Experimental Example 1.

Experimental Example 3

Evaluation of Method Other than Coating

An aluminum alloy ADC12 material was used as a test piece. In a pretreatment, the test piece was immersed as an anode in a 200 g/L sulfuric acid bath, and a direct current was applied for 10 minutes at a current density of 1.5 A/dm$^2$. Thus, a 3 μm anodic oxide film (insulating porous film having a pore diameter of 0.02 μm) was prepared. Here, a method in which the poorly water-soluble lithium compound (LiAl$_2$(OH)$_7$.H$_2$O) was disposed directly on the surface was attempted as a method other than the method in which a poorly water-soluble lithium compound was mixed in a coating material. A metal member of Preparation Example 14 was prepared by a simple method in which the poorly water-soluble lithium compound in the form of powder was attached to an adhesive surface of a water-permeable pressure-sensitive adhesive tape made of paper at a ratio of 50 g/m$^2$, and the tape was attached onto the surface of the test piece.

In the metal member of Preparation Example 14, defects reaching the aluminum base material through the tape were created, and the salt spray test (JIS-Z-2371) was conducted for 120 hours. As a result, no corrosion was observed in the defect portion, indicating that the metal member had corrosion resistance.

INDUSTRIAL APPLICABILITY

The present invention is industrially useful, because the present invention makes it possible to provide an environmentally benign metal member having excellent corrosion resistance which exhibits a long-lasting corrosion resistance effect even in a saltwater environment or the like in which a water current is present.

REFERENCE SIGNS LIST

1: aluminum base material, 2: defect portion, 3: corroded portion

TABLE 2

Salt Spray Test Results

| | Lithium compound | Solubility in water | Content of lithium compound [g/m$^2$] | Corrosion resistance of defect portion | Adverse influence on film | Overall results |
|---|---|---|---|---|---|---|
| Prep. Ex. 10 | LiH(AlO$_2$)$_2$•5H$_2$O | Poorly soluble | 10 | Present | Absent | Good |
| Prep. Ex. 11 | LiAlO$_2$ | Poorly soluble | 80 | Present | Absent | Good |
| Prep. Ex. 12 | Li$_3$PO$_4$ | Poorly soluble | 80 | Present | Absent | Good |
| Prep. Ex. 13 | Li$_2$CO$_3$ | Poorly soluble | 80 | Present | Absent | Good |
| Ref. Ex. 1 | LiOH•H$_2$O | Highly soluble | 100 | Present | Present | Poor |
| Ref. Ex. 2 | Li$_2$SiO$_3$ | Highly soluble | 50 | Present | Present | Poor |

As shown in the results of the salt spray test in Table 2, corrosion inhibition in the defect portion was observed in all of Preparation Examples 10 to 13 and Reference Examples 1 and 2. However, in Reference Examples 1 and 2 in which the highly water-soluble lithium compounds were used, the lithium compounds were dissolved upon contact with salt water, causing failures in appearance such as peeling of the coating material. From these results, it was found that poorly soluble compounds are important among lithium compounds.

The invention claimed is:

1. A metal member comprising an aluminum-based metal substrate and a corrosion protection film containing a poorly water-soluble lithium compound on the aluminum-based metal substrate, wherein the poorly water-soluble lithium compound is LiH(AlO$_2$)$_2$·5H$_2$O or LiAl$_2$(OH)$_7$·xH$_2$O, wherein the solubility of the poorly water-soluble lithium compound in water is 10 g/L or less at room temperature, wherein the corrosion protection film is a coating film containing the poorly water-soluble lithium compound and solid components of a coating material, and wherein the coating material is acrylic silicon-based coating materials, fluororesin-based coating materials, or alcohol-based coating materials.

2. The metal member according to claim 1, further comprising a second coating film above the corrosion protection film.

3. The metal member according to claim 2, wherein the corrosion protection film is formed by applying the coating film which has insulating properties and contains the poorly water-soluble lithium compound and solid components of the coating material onto the aluminum-based metal substrate.

4. The metal member according to claim 1, further comprising an anodic oxide film formed between the aluminum-based metal substrate and the corrosion protection film, the anodic oxide film being formed by introducing the aluminum-based metal substrate in an anodizing treatment liquid and applying an electric current with the aluminum-based metal substrate used as an anode to electrolyze the treatment liquid.

5. The metal member according to claim 1, wherein the corrosion protection film has pores with a pore size in a range from 0.1 to 0.3 nm in diameter and the pores are configured to be large enough so that lithium ions can pass through but small enough so that water cannot pass through.

6. The metal member according to claim 1, wherein the poorly water soluble lithium compound has a content per unit area of the coating film from 1to 200g/m$^2$.

7. The metal member according to claim 6, further comprising an anodic oxide film formed between the aluminum-based metal substrate and the corrosion protection film, wherein the corrosion protection film is formed by applying the coating film containing the poorly water-soluble lithium compound and solid components of the coating material onto the anodic oxide film, and wherein the poorly water-soluble lithium compound is $LiAl_2(OH)_7 \cdot xH_2O$.

8. The metal member according to claim 1, wherein the coating material is acrylic silicon-based coating materials, or alcohol-based coating materials.

* * * * *